United States Patent [19]

Moss et al.

[11] 4,044,112
[45] Aug. 23, 1977

[54] HOT-PRESSABLE MAGNESIUM FLUORIDE POWDER

[75] Inventors: Robert H. Moss, Cleveland Heights; Carl F. Swinehart, University Heights; William F. Spicuzza, Eastlake, all of Ohio

[73] Assignee: The Harshaw Chemical Company, Cleveland, Ohio

[21] Appl. No.: 632,059

[22] Filed: Nov. 14, 1975

Related U.S. Application Data

[63] Continuation-in-part of Ser. No. 447,948, March 4, 1974, Pat. No. 3,920,802.

[51] Int. Cl.$^2$ .............................................. C01F 5/28
[52] U.S. Cl. ....................................... 423/490; 264/1
[58] Field of Search ............... 423/490, 659 I, 659 R; 264/1

[56] References Cited

U.S. PATENT DOCUMENTS

| | | | |
|---|---|---|---|
| 2,441,668 | 5/1948 | Mathers et al. | 423/490 X |
| 3,365,271 | 1/1968 | Carnall, Jr. et al. | 423/490 |
| 3,408,430 | 10/1968 | Lachman | 423/490 X |
| 3,816,600 | 6/1974 | Huizing et al. | 423/490 X |
| 3,920,802 | 11/1975 | Moss et al. | 423/490 |

Primary Examiner—Edward Stern
Attorney, Agent, or Firm—Alfred D. Lobo; James A. Lucas

[57] ABSTRACT

A process is disclosed for converting basic magnesium carbonate into pure hot-pressable magnesium fluoride such as is used for the hot-pressing of infra-red radiation transmitting optical bodies. The process includes contacting a slurry of basic magnesium carbonate with carbon dioxide to form enough magnesium bicarbonate or hydrates of magnesium carbonate, in situ, to alter the particles in the slurry. Carbonation of the slurry increases solubility of the solids by establishing an equilibrium relationship in solution between the unstable magnesium bicarbonate and hydrates of magnesium carbonate particles. When the carbonated slurry is contacted with a slight excess of hydrofluoric acid it precipitates solid particles of fine hydrous magnesium fluoride. Neutralization of excess hydrofluoric acid is effected with ammonium hydroxide. The solid particulate precipitate is dried and calcined to yield hot-pressable magnesium fluoride powder of exceptional purity and consistent quality.

A hot-pressable magnesium fluoride powder has been prepared which has a specific and uniform refractive index, $n_D = 1.3850$ at 20° C; the powder is made up of primary particles the majority of which have an average particle diameter of greater than 5 $\mu$ (microns). These physical properties and a characteristic ill-defined X-ray diffraction pattern suggestive of an amorphous structure, allow the powder to be hot-pressed into an optical body without grinding the powder.

1 Claim, 1 Drawing Figure

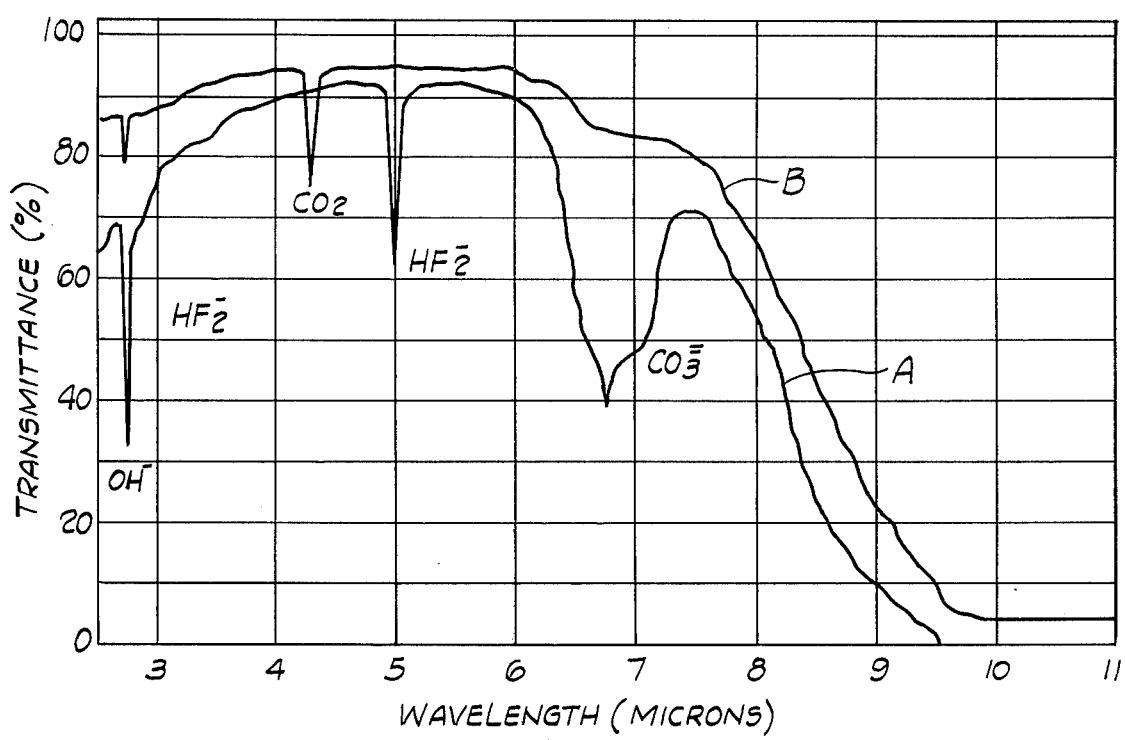

HOT-PRESSABLE MAGNESIUM FLUORIDE POWDER

CROSS-REFERENCE TO RELATED APPLICATIONS

This application is a continuation-in-part of applicants' copending application, Ser. No. 447,948 filed Mar. 4, 1974 now issued as U.S. Pat. No. 3,920,802.

BACKGROUND OF THE INVENTION

Ultra-pure magnesium fluoride ($MgF_2$) has been made by a variety of laboratory methods with no regard for the pressability of the $MgF_2$ powder. Purity of $MgF_2$ powder is not determinative of its pressability, and only that powder is pressable which consists of deformable particles. The commercial preparation of the ultra-pure alkali metal fluorides and alkaline earth metal fluorides is of relatively recent interest, this interest having been sparked by the widespread use of these fluoride powders for hot-pressed infra-red radiation transmitting windows, and other optical elements which are now commonplace.

It is to be noted that a pressable powder consists of "deformable" individual particles, and, conventional powder unless specified otherwise, does not. Deformable particles are defined as those which may be physically deformed under sufficiently high heat and pressure conditions to form an optically integral body. Acceptable infra-red radiation transmitting bodies of inorganic crystalline ionic halides are generally characterized by relatively high transmittance of infra-red radiation, often in excess of 90%, over a relatively wide range of wavelengths up to about $10\mu$ (microns), depending upon the particular crystalline halide used. Magnesium fluoride optics are of particular importance for transmittance in the range from about $1\mu$ to about $7\mu$. In this relatively wide range, it is difficult to hot-press even essentially pure magnesium fluoride powder, irrespective of how it is obtained, into a hot-pressed optical body essentially free of absorption bands. That high purity is not the essential criterion of pressability is evident from the fact that high purity crystals obtained by grinding a melt-grown ingot of $MgF_2$ are not pressable into an optical body. Neither are crystalline powders obtained from hot-pressed $MgF_2$ optical bodies. This difficulty is attributable to the physical characteristics of the unpressable particles, such as crystalline structure, size and shape, and also to their purity which characteristics preclude deformability under hot-pressing conditions. Throughout this specification the term "pressable" is used to describe a mass of deformable particles in the strict sense that it connotes that the mass can be hot-pressed into an optically integral body which will not scatter radiation in a predetermined wavelength. There is a vast difference between particles which yield a solid body which may be essentially opaque, and an optically integral body. Though it is difficult, if not impossible, to define a pressable powder in absolute terms the distinction between a pressable powder and one that is not, is immediately apparent after each is pressed under sufficient pressure and at a temperature below the melting point.

It is well known that even high-quality hot-pressed magnesium fluoride optical bodies are not uniformly permeable to radiation throughout all regions of a transmittance spectrum, but exhibit absorption bands therewithin which are undesirable in many applications. Absorption bands corresponding to hydroxyl ($OH^-$) at about $2.8\mu$, to carbon dioxide ($CO_2$) at about $4.3\mu$, to bifluorides ($HF_2^-$) at $5.0\mu$, and to carbonate ($CO_3^=$) at $7.0\mu$ wavelengths, as well as the absorption bands at $3.0\mu$ and $6.1\mu$ for moisture, inter alia, are particularly troublesome in the development of high-quality infra-red wavelength transmitting elements made of magnesium fluoride.

Absorption bands in hot-pressed magnesium fluoride were recognized early in the development of optical bodies from hot-pressed powder. For example, a typical transmittance curve (See "Hot Pressing Magnesium Fluoride" by Buckner, Hafner and Kreidl, Jour. of Amer. Ceramic Soc. 34, No. 9, pages 425–438, 1962) for a hot pressed magnesium fluoride optical body shows several sharp absorption bands which occur at the frequency usually taken as —O—H bending. It is to the minimization of these impurities with economy, that the instant invention is concerned.

More specifically, no presently available magnesium fluoride powder may be hot-pressed in the range from about 15,000 psi to about 80,000 psi, to yield an optical body which is simultaneously free of absorption bands due to $CO_2$, $H_2O$, carbonate and hydroxyl ions, and acid fluorides (thought to be mainly $HF_2^-$ and homologous ions of a similar nature). Furthermore, no presently available pressable $MgF_2$ powder is available in a particle size range which may be directly hot-pressed, without grinding, or, which has a specific, uniform refractive index $n_D = 1.3850$ at 20° C, for all particles. It is to meet, not only the increasingly stringent quality specifications demanded of hot-pressed magnesium fluoride optical bodies, but also a demand for a powder with predictably consistent hot-pressing characteristics that the instant invention is directed.

SUMMARY OF THE INVENTION

It has been discovered that by saturating an aqueous slurry of finely divided insoluble magnesium carbonate powder with carbon dioxide gas, and continuing to pass the $CO_2$ gas through the slurry, at a relatively low temperature above the freezing point of the slurry but below about 60° C, and at sufficient pressure to maintain a predetermined concentration of $CO_2$ gas in solution, the physical and chemical properties of the slurry are unexpectedly and favorably modified. These properties are essential for the subsequent processing of magnesium carbonate.

It has further been discovered that an aqueous slurry of powdered magnesium carbonate saturated with carbon dioxide may be reacted with aqueous hydrofluoric acid to precipitate finely divided solid particular pressable magnesium fluoride which, unexpectedly has so uniform a particle size distribution that it need not be ground before it is hot-pressed.

It is therefore a general object of this invention to provide a wet process for preparing ultra-pure pressable magnesium fluoride powder in an industrial operation, from commercially available basic magnesium carbonate, typically $4\ MgCO_3 \cdot Mg(OH)_2 \cdot 4\ H_2O$, without trapping unreacted magnesium carbonate within deformable magnesium fluoride particles precipitated, said carbonate being responsible for absorption at $7.0\mu$ in a finished, hot-pressed body.

It is another general object of the invention to provide ultra-pure magnesium fluoride particles precipitated from solution in a finely divided crystalline form, having a predictable size range distribution which is particularly well-adapted for the hot-pressing of high-quality magnesium fluoride optical bodies.

It is a specific object of this invention to utilize a particular property of magnesium bicarbonate and/or magnesium carbonate hydrates, in equilibrium in a slurry of magnesium carbonate through which carbon dioxide is bubbled, in such a manner that the energy required to stir the slurry is decreased, associated with other physical changes, which together unexpectedly aid and propagate the complete reaction of magnesium carbonate when it is added to a liquid hydrofluoric acid solution.

It is still another specific object of this invention to provide a hot-pressable magnesium fluoride powder which yields an infra-red radiation transmitting body with substantially reduced hydroxyl absorption and essentially no absorption due to bifluorides, each of which absorptions is an unwanted characteristic of standard luminescent grade magnesium fluoride powder.

It is also still another specific object of this invention to provide a hot-pressable magnesium fluoride powder which yields an infra-red radiation transmitting body which is optically integral as evidenced by lack of scatter to radiation in the wavelength from about $2\mu$ to about $9\mu$, and which body contains no voids larger than $2\mu$ in average diameter.

It is yet another object of this invention to convert a magnesium carbonate powder having a primary particle average diameter of less than $1\mu$ into a particulate ultra-pure magnesium fluoride which may be recovered from solution as fine particles the majority of which are greater than $5\mu$ average diameter, without forming hard lumps such as require that the powder be ground to yield a particle size suitable for the hot-pressing of an optical body.

It is also another specific object of this invention to produce a powder having a specific and uniform refractive index, $n_D = 1.3850$ at 20° C, a characteristic unlike that of any other known precipitated $MgF_2$ which is calcined.

These and other objects, features and advantages of this process will become apparent to those skilled in the art from the following description of preferred forms thereof and the examples set forth herein.

BRIEF DESCRIPTION OF THE DRAWING

FIG. 1 illustrates typical transmission spectra of unpolished optical flats, curve A indicating the transmittance of a body hot-pressed from known pressable magnesium fluoride powder; and, curve B indicating the transmittance of a body hot-pressed from the powder of this invention.

DETAILED DESCRIPTION OF A PREFERRED EMBODIMENT OF THE INVENTION

In one embodiment of this invention, A. R. grade basic magnesium carbonate powder (MgO approximately 42%), having primary particles with an average diameter of less than about $1\mu$, is used, which has the following analysis:

| MAXIMUM LIMIT OF IMPURITIES | |
|---|---|
| Soluble Salts | 0.40% |
| Insoluble in Hydrochloric Acid and Ammonium Hydroxide Precipitate | 0.02% |
| Sulfate and Sulfite (as $SO_4$) | 0.005% |
| Chloride (Cl) | 0.002% |

| -continued | |
|---|---|
| MAXIMUM LIMIT OF IMPURITIES | |
| Heavy Metals (as Pb) | 0.001% |
| Iron (Fe) | 0.002% |
| Nitrate ($NO_3$) | 0.003% |
| Calcium (Ca) | 0.02% |

Magnesium carbonate powder is slurried in water to form a thick, but fluent paste. The slurry is contained in a vessel which is provided with means for bubbling carbon dioxide gas through the slurry. Alternatively, chips of frozen carbon dioxide may be introduced into the reaction vessel while the contents are stirred. The particular form in which carbon dioxide is introduced into the slurry is unimportant provided that carbon dioxide gas freely contacts the particles in the slurry. At least sufficient $CO_2$ is used to saturate the aqueous slurry, and it is preferred to use a substantial excess so that an unnecessarily long period of stirring and contacting with gas will be avoided.

Basic magnesium carbonate is $MgCO_3.Mg(OH)_2.3H_2O$, also available as $4MgCO_3.Mg(OH)_2.4H_2O$, and as $3MgCO_3.Mg(OH)_2.xH_2O$. Each is relatively insoluble, having a solubility in water of about 0.04 g/100g solution at 25° C, and about 0.011 g/100g solution at 100° C. When an aqueous slurry of basic magnesium carbonate is carbonated, magnesium carbonate forms the hydrates $MgCO_3.3H_2O$, $MgCO_3.5H_2O$, and $MgCO_3.H_2O$ generally, together with $Mg(HCO_3)_2$, which are stable only in an atmosphere of carbon dioxide.

The solubility of magnesium carbonate in water increases with increasing carbon dioxide pressure and decreasing temperature. Under pressure of about 18 atm. of $CO_2$, a crystallized, unstable $Mg(HCO_3)_2$ is formed, so a pressure high enough to cause such crystallization is to be avoided. Generally, carbonation is carried out at relatively low temperatures above the freezing point of the slurry (0° C), and at a partial pressure of at least 0.2 atm. of $CO_2$ but less than about 18 atms. A preferred operating pressure is in the range from about 0.8 atm. to about 10 atms., and a preferred temperature range is in the range from about 10° C to about 30° C. It is also desirable to maintain a blanket of $CO_2$ over the slurry while it is being carbonated to displace air and to provide additional contact with $CO_2$.

It is found that best results are obtained when the slurry is relatively thick but fluent, and has a high solids content. A preferred solids content is in the range from about 10 to about 25 percent by weight, based on total solids, or from about 3 Kg to about 7 Kg of magnesium carbonate in sufficient water to make up a volume of 23 liters. Optimum pressure and temperature conditions are such as to dissolve only a minor portion of the magnesium carbonate by converting it to hydrates of magnesium carbonate and magnesium bicarbonate. The precise extent of conversion of magnesium carbonate is determined by the equilibrium established during carbonation, and is not important, as long as a desired transformation is indicated by a decrease in the energy required to maintain the slurry in a well-stirred condition.

It is well known that an alkaline earth metal carbonate may be reacted with HF acid to form an alkaline earth metal fluoride. Thus, calcium fluoride, $CaF_2$ may be prepared by reacting $CaCO_3$ with HF, and $MgF_2$ may be prepared by reacting $MgCO_3$ with HF. However, in each case a small portion of the alkaline earth metal carbonate tends to get trapped within the fluoride formed, resulting in a nucleus of the carbonate enveloped by the newly formed fluoride. This trapping of calcium or magnesium carbonate particles is evidenced by an absorption band at 7.0μ. It is hypothesized that the nucleus of carbonate results from the formation of agglomerates of so tightly adherent particles that conversion to the fluoride is incomplete. Furthermore, it is known that with $CaF_2$, "such a process has the disadvantages of producing a product which is relatively expensive and of non-uniform particle size, . . . " (U.S. Pat. No. 2,653,857, Col. 1, lines 13–15).

In known wet manufacturing processes, one of the problems has been the difficulty of causing alkaline earth metal fluoride crystals to develop from colloidally fine and submicron particles, into particles of undesirable size, say about 1μ average diameter, so that the material can be handled in conventional equipment. In the wet manufacture of $CaF_2$ this has required large volumes of solution to be held at their boiling temperature for several hours. Surprisingly, the process of our invention yields solid particulate magnesium fluoride, which is in a particularly desirable size range for hot-pressing into optical bodies, without holding at elevated temperatures for a long period of time.

To obtain magnesium fluoride powder from the carbonated slurry, the slurry is added gradually to an aqueous hydrofluoric acid solution which is kept well-agitated. The concentration of the aqueous HF solution is not critical and is chosen with regard to the solids content of the slurry. If the liquid content of the slurry is relatively high, a more concentrated aqueous HF acid is desirable, while with a relatively high solids content of about 15% by weight, based on total solids, a 49% HF acid is preferred.

The amount of HF acid added is such that a slight excess of HF acid remains after the reaction is complete. About 5 - 20 percent excess HF over the theoretical amount required to convert the carbonates into the fluorides, is sufficient. A larger excess may be used but no additional benefit enures to the process, to offset the additional cost. A smaller excess may be operable, but entails the risk of providing insufficient acid throughout the reaction mass.

Since the reaction is exothermic, it is important to carry out the reaction with due care. It is desirable to choose a rate of addition of slurry such that the temperature of the reaction mass is maintained in the range from about 60° C to about 80° C, and in any event below the boiling point of HF acid under the reaction conditions. Stirring is continued after the reaction is essentially completed and until gassing subsides. The solids are then permitted to settle and the supernatant liquid is decanted to leave a mass of wet solids.

Reagent grade ammonium hydroxide is gradually stirred into the wet solids to neutralize the excess HF acid present to an extent such that the mass has a pH in the range from about 2 to about 4, and more preferably, in the range from about 2.5 to about 3. The wet solid particles are dried to remove moisture, then calcined at a temperature in the range from about 500° – 600° C to yield pressable magnesium fluoride powder. Surprisingly, the powder is relatively lump-free, and such lumps as may be present are agglomerates of powder which are easily broken up simply by sieving the lumps through a coarse screen.

In the above process the ammonia neutralization forms $NH_4HF_2$ which is removed during heating. An alternative process would be to remove the excess acid by washing to a pH in the range from about 2.0 to about 4, and preferably from 2.5 to 3.

The powder has a specific and uniform refractive index $n_D = 1.3850$ at 20° C, a characteristic which is unique for a pressable $MgF_2$ powder. This unique characteristic may be checked in a simple fashion by mixing the powder with n-propanol having an $n_D = 1.3850$ at 20° C. It is found that the mixture is not cloudy, but transparent so that one may read written symbols through it. This transparency, which is indicative of the uniform refractive index of all the particles, may not be duplicated with any known precipitated $MgF_2$ powder. Ground optical crystals of $MgF_2$ have essentially the same uniform refractive index but a powder of such crystals is not deformable, with the result that a solid body hot-pressed from the powder, has virtually no transmission of a light beam, and, cannot be classed as an optically integral body. Refer also to Buckner et al., supra, for recognizing the lack of transmission of pressings made from powder heated over 700° C, which is one method of converting conventional precipitated $MgF_2$ to a uniform refractive index, if hydrolysis is avoided.

A peculiar property of the pressable calcined particles obtained directly in this invention is that a powder of these particles exhibits a fuzzy Debye-Scheurer X-ray pattern, suggesting an amorphous structure. Such a fuzzy or ill-defined X-ray pattern is quite atypical of a well-defined crystal lattice. For example, the X-ray pattern of a crushed melt-grown ingot exhibits a sharp X-ray pattern. It is the unique ill-defined X-ray pattern which is a characteristic of the $MgF_2$ powder of this invention which is thought to be indicative of a pressable powder. Sharp X-ray patterns of well-defined crystalline structures indicate that individual particles are not deformable. This is consistent with the observation that deformable particles have slip bands whereas melt-grown crystals of $MgF_2$ have no slip capability.

The precipitated $MgF_2$ powder of this invention is also unique in that it consists of particles the majority of which are in a size range from about 5μ to about 45μ, essentially no particles are formed which are greater than about 62μ or smaller than about 0.5μ. More preferably, at least about two-thirds (66.66%) by weight of the particles have an average particle diameter greater than about 5μ and less than 62μ, and more than about one-third (33.3%) by weight have an average diameter greater than 15μ but less than 62μ. This unique particle size distribution of deformable particles is especially well-adapted for hot-pressing a pressable powder of these particles into optical bodies.

The following examples serve to illustrate the invention.

EXAMPLE 1

Weigh about 6.8 kg. of basic magnesium carbonate, $4MgCO_3(OH)_2.4H_2O$ into a 25 liter polyethylene plastic carboy fitted with a spigot, and add sufficient distilled water to bring the volume to about 23 liters. Slowly stir the mixture to form a homogeneous fluent paste or thick slurry, and bubble carbon dioxide gas through the slurry at a rate of about 10–20 ft.$^3$/hr. for at least 3 hours to yield a more fluent saturated carbonated paste or slurry, which terms are used interchangeably herein.

Charge a 40 liter drum equipped with a mixer, with about 6.3 liters of a 49% aqueous solution of hydrofluoric acid. Add the carbonated slurry to the drum while mixing continuously at a rate consistent with maintaining the temperature of the reaction mixture in the range from about 60° C to about 80° C. The reaction drum is kept covered, but not gas-tight, to maintain a blanket of $CO_2$ gas above the reaction mass.

The solids content of the reaction mass is allowed to settle and excess liquid is siphoned away. Then the wet solids is then added conc. $NH_4OH$ in incremental small amounts to essentially neutralize excess HF acid. Any other base may be used which will form a fluoride which may be subsequently driven away, that is, an expellable fluoride. The reaction mass is maintained slightly on the acid side, preferably in the pH range from about 2 to about 4. The ammoniated slurry is then dried in a conventional convection oven to drive off moisture until a dry, magnesium fluoride powder is obtained. When this $MgF_2$ powder is calcined overnight in a platinum crucible at a temperature of about 550° C, it is found to have a consistent particle size distribution in a relatively narrow particle size range preferred for hot-pressing optical bodies. A comparison of the particle size distribution between a typical, conventional, ground $MgF_2$ powder, and the unground powder of this invention, is set forth hereinbelow in Table I.

TABLE I

| Avg. Diam. Microns | WEIGHT PERCENT | |
|---|---|---|
| | Conventional $MgF_2$ Ground Powder | New $MgF_2$ Unground Powder |
| 55.7 | 0.4 | 0.9 |
| 44.4 | 1.6 | 4.6 |
| 35.2 | 3.1 | 6.3 |
| 28.0 | 3.5 | 7.6 |
| 22.2 | 5.7 | 9.8 |
| 17.6 | 5.3 | 8.2 |
| 14.0 | 5.7 | 6.5 |
| 11.1 | 7.1 | 6.3 |
| 8.8 | 7.8 | 6.2 |
| 7.0 | 9.1 | 5.4 |
| 5.5 | 8.8 | 6.3 |
| 4.4 | 7.4 | 6.5 |
| 3.5 | 6.8 | 6.3 |
| 2.8 | 5.7 | 5.8 |
| 2.2 | 5.1 | 4.3 |
| 1.8 | 4.1 | 3.3 |
| 1.4 | 4.1 | 2.4 |
| 1.1 | 3.4 | 1.8 |
| 0.88 | 2.6 | 1.4 |
| 1.70 | 2.7 | — |
| 0.56 | — | — |

Referring now to FIG. 1 there is shown a transmission spectrum (Curve A) of a conventional hot-pressed optical body and a transmission spectrum of a hot-pressed body made with powder prepared by the process of this invention (Curve B). It is seen that the absorption bands due to bifluorides ($HF_2^-$) and carbonate ($CO_3^=$) have been essentially eliminated, and the bands due to hydroxyl ($OH^-$) and $CO_2$ are remarkably diminished.

It is found that each batch of pressable $MgF_2$ prepared as described hereinabove, is uniformly pressable at essentially the same press conditions, obviating the need for trial and error from one batch to another. As will also be seen from the foregoing Table I, more than 50% of the $MgF_2$ particles of this invention are generally larger than $5\mu$ and more than about 33% by weight are larger than $14\mu$. Conventional, ground powder (standard luminescent grade) may contain more than 50% of the particles larger than $5\mu$, but will typically have less than 33% by weight larger than $14\mu$, as for example in Table I, 19.6% are greater than $14\mu$ (middle col.).

It is recognized that commercial SL grade powder may be sieved to separate the powder into desired sizes or fractions, and then selected amounts of certain fractions may be reconstituted to yield a powder having the size distribution of the powder of this invention. But the powder so reconstituted would not be pressable unless treated to remove bound moisture present.

The tapped bulk density of calcined pressable $MgF_2$ powder of this invention is $0.60\pm0.05$ gm/cc. The tapped bulk density is arrived at by placing about 5 gm. of powder in a 10 ml. graduated cylinder and tapping the base of the cylinder on a laboratory bench, or other hard surface, 10 times, and reading the volume of the powder.

EXAMPLE 2

A hot pressed blank of polycrystalline magnesium fluoride is formed as follows:

A charge of 950 g. of pressable calcined $MgF_2$ powder obtained as described hereinabove is loaded into a cool 3.5 in. diameter molding cylinder in a conventional molding apparatus of the type described more fully in U.S. Pat. No. 3,365,271 except that no vacuum is necessary. The temperature is gradually raised to about 650° C. and pressure is applied to the powder by a molding ram within the cylinder. The initial molding pressure is about 2000 psi and it is gradually increased to about 60,000 psi. and held there for a short time in the range from about 10 minutes to about 40 minutes. The molded blank so obtained is cooled, removed from the mold, and finished. It is a clear, homogeneous unitary polycrystalline solid free of any visible defects, having specular transmission in the infrared wavelength region and a density of at least 99% up to and including theoretical density. When tested it exhibits essentially 90 percent transmittance for at least some wavelengths in the range from about $1\mu$ to about $7\mu$ and is therefore deemed optically integral to this range of wavelength. The blank molded herein has a milky white appearance and lacks the characteristic tint of blanks made from ground magnesium fluoride powder. As is well known, grinding very hard $MgF_2$ powder inevitably picks up trace impurities from the vessel in which the powder is ground. For example, powder ground in alloy steel apparatus characteristically gives a yellow, green or orange tint depending upon the composition of the alloy.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

We claim:

1. A pressable magnesium fluoride powder consisting essentially of unground calcined individual particles deformable under sufficient heat and pressure to form an optical body, said powder having a uniform particle size distribution wherein more than 50 percent by weight of said particles is in the size range from about 5 $\mu$ to about 62 $\mu$ average particle diameter, and more than 33 percent by weight of said particles are greater than 14 $\mu$ average particle diameter, said powder having a uniform refractive index of $n_D = 1.3850$ at 20° C, and exhibiting a Debye-Scheurer X-ray pattern indicating the magnesium fluoride powder to be of an amorphous structure.

* * * * *